US008255330B2

(12) United States Patent
Cameo et al.

(10) Patent No.: US 8,255,330 B2
(45) Date of Patent: Aug. 28, 2012

(54) OVERDRAFT PROTECTION AND FORGIVENESS

(75) Inventors: Valerie Felice Cameo, Chicago, IL (US); Mark Dickelman, Inverness, IL (US); Victoria Ann Vogt, Plymouth, MN (US)

(73) Assignee: U.S. Bank National Association, Cincinnati, OH (US)

( * ) Notice: Subject to any disclaimer, the term of this patent is extended or adjusted under 35 U.S.C. 154(b) by 42 days.

(21) Appl. No.: 12/901,138

(22) Filed: Oct. 8, 2010

(65) Prior Publication Data

US 2011/0125643 A1 May 26, 2011

Related U.S. Application Data

(60) Provisional application No. 61/250,267, filed on Oct. 9, 2009.

(51) Int. Cl.
*G06Q 40/00* (2012.01)
(52) U.S. Cl. ............... 705/44; 705/35; 705/40; 705/41; 705/42; 705/43; 705/45
(58) Field of Classification Search .................... 705/35, 705/40–45
See application file for complete search history.

(56) References Cited

U.S. PATENT DOCUMENTS

| | | | |
|---|---|---|---|
| 5,465,206 A | 11/1995 | Hilt et al. | |
| 5,596,642 A | 1/1997 | Davis et al. | |
| 5,596,643 A | 1/1997 | Davis et al. | |
| 5,649,117 A | 7/1997 | Landry | |
| 5,649,118 A | 7/1997 | Carlisle et al. | |
| 5,650,604 A | 7/1997 | Marcous et al. | |
| 5,717,989 A | 2/1998 | Tozzoli et al. | |
| 6,070,150 A | 5/2000 | Remington et al. | |
| 6,292,789 B1 | 9/2001 | Schutzer | |
| 6,298,335 B1 | 10/2001 | Bernstein | |
| 6,529,187 B1 | 3/2003 | Dickelman | |
| 7,092,913 B2 | 8/2006 | Cannon, Jr. | |
| 7,174,302 B2 | 2/2007 | Patricelli et al. | |
| 7,280,981 B2 | 10/2007 | Huang et al. | |
| 7,387,238 B2 * | 6/2008 | Foss et al. | 235/380 |
| 7,464,859 B1 | 12/2008 | Hawkins | |
| 7,584,151 B2 | 9/2009 | Wells et al. | |
| 7,590,557 B2 | 9/2009 | Harrison et al. | |
| 7,617,156 B1 * | 11/2009 | Wolfson | 705/42 |
| 7,627,523 B1 | 12/2009 | Symonds et al. | |
| 7,661,586 B2 | 2/2010 | Robbins, Jr. et al. | |
| 7,664,690 B2 | 2/2010 | Dirnberger et al. | |
| 7,664,705 B2 * | 2/2010 | Walker et al. | 705/45 |
| 7,680,679 B1 | 3/2010 | Patricelli et al. | |
| 7,702,530 B2 | 4/2010 | Pearson | |
| 7,702,553 B1 | 4/2010 | Dickelman | |

(Continued)

*Primary Examiner* — Narayanswamy Subramanian
(74) *Attorney, Agent, or Firm* — Crawford Maunu PLLC

(57) ABSTRACT

Various aspects relate to systems, methods or devices for processing overdrafts made by customers. A particular embodiment is directed towards, a system that is configured to receive transaction data from customer-oriented terminals. The transaction data includes requests for monetary transfers on behalf of customers that hold a checking or savings account at a financial institution. In response to receiving the transaction data, the system accesses customer account information, which can include the amount of funds in the checking or savings accounts. The system determines whether sufficient funds exist in the accounts to cover the financial transactions. In response to a potential overdraft of one or more customer accounts, stored customer information is accessed to determine and authorize overdraft deferment eligibility of the customer based upon the stored customer information. The system defers an overdraft fee by providing a grace period during which funds can be transferred to cover the overdraft.

19 Claims, 2 Drawing Sheets

U.S. PATENT DOCUMENTS

| | | |
|---|---|---|
| 7,702,577 B1 | 4/2010 | Dickelman |
| 7,711,621 B2 | 5/2010 | Huang et al. |
| 7,814,019 B2 * | 10/2010 | Knapp ............................ 705/45 |
| 8,074,876 B2 * | 12/2011 | Foss et al. ...................... 235/380 |
| 2001/0014878 A1 | 8/2001 | Mitra et al. |
| 2002/0002495 A1 | 1/2002 | Ullman |
| 2002/0111886 A1 | 8/2002 | Chenevich et al. |
| 2002/0111915 A1 | 8/2002 | Clemens et al. |
| 2002/0111916 A1 | 8/2002 | Coronna et al. |
| 2002/0145051 A1 | 10/2002 | Charrin |
| 2002/0184147 A1 | 12/2002 | Boulger |
| 2003/0009382 A1 | 1/2003 | D'Arbeloff et al. |
| 2003/0061147 A1 | 3/2003 | Fluhr et al. |
| 2003/0061157 A1 | 3/2003 | Hirka et al. |
| 2004/0024703 A1 | 2/2004 | Roskind |
| 2004/0030657 A1 | 2/2004 | Holm-Blagg et al. |
| 2004/0044621 A1 | 3/2004 | Huang et al. |
| 2004/0080691 A1 | 4/2004 | Mi et al. |
| 2004/0093302 A1 | 5/2004 | Baker et al. |
| 2005/0060579 A1 | 3/2005 | Dickelman et al. |
| 2005/0077350 A1 | 4/2005 | Courtion et al. |
| 2005/0222961 A1 | 10/2005 | Staib et al. |
| 2005/0267840 A1 | 12/2005 | Holm-Blagg et al. |
| 2006/0089906 A1 | 4/2006 | Rowley |
| 2006/0116957 A1 | 6/2006 | May et al. |
| 2007/0038577 A1 | 2/2007 | Werner et al. |
| 2007/0106558 A1 * | 5/2007 | Mitchell et al. .................. 705/16 |
| 2007/0282743 A1 | 12/2007 | Lovelett et al. |
| 2008/0015985 A1 * | 1/2008 | Abhari et al. .................... 705/42 |
| 2008/0046358 A1 | 2/2008 | Holm-Blagg et al. |
| 2008/0103985 A1 | 5/2008 | Huang et al. |
| 2008/0275748 A1 | 11/2008 | John |
| 2008/0306838 A1 | 12/2008 | Fleet et al. |
| 2008/0307034 A1 | 12/2008 | Fleet et al. |
| 2009/0030848 A1 | 1/2009 | Wendel |
| 2009/0037310 A1 * | 2/2009 | Claypoole et al. .............. 705/35 |
| 2010/0138288 A1 * | 6/2010 | Walker et al. ............. 705/14.25 |
| 2011/0125643 A1 * | 5/2011 | Cameo et al. .................... 705/44 |
| 2012/0054093 A1 * | 3/2012 | Schamer et al. ................. 705/39 |

* cited by examiner

OVERDRAFT PROTECTION AND FORGIVENESS

RELATED PATENT DOCUMENTS

This patent document claims the benefit, under 35 U.S.C. §119(e), of U.S. Provisional Patent Application Ser. No. 61/250,267, entitled "Overdraft Protection and Forgiveness" to Cameo, Valerie and filed on Oct. 9, 2009, which is fully incorporated herein by reference as describing and illustrating subject matter (in part(s) or in its entirety) that can be practiced with the subject matter disclosed herein.

FIELD OF THE INVENTION

The present disclosure relates to integrated financial network systems and more particularly pertains to an overdraft protection program that provides customers with a grace period before they are charged for an overdraft of their accounts.

OVERVIEW

Banks provide various services to their customers. Customers holding account(s) at a bank initiate a number of transfers, withdrawals, deposits and other functions that banks oversee, audit and otherwise facilitate. Many bank systems operate using periodic settlement of outstanding transactions. Transactions are accumulated during the day and then settlement occurs between banks and/or other parties (e.g., vendors or merchants). The value in a customer's account can vary throughout the day. Unlike a credit card account, overdrafts occur on a fund bearing account that, at settlement time, has pending transactions exceeding the funds in the account. After settlement occurs and an account is overdrawn, the disparity between the pending transactions and the account value is often temporarily covered by the account-holding bank while the customer is charged an overdraft fee.

Aspects of the present disclosure are exemplified in a number of illustrated implementations and applications, some of which are shown in the figures and characterized in the claims section that follows.

SUMMARY

The present disclosure is exemplified in a number of embodiments, implementations and applications, some of which are summarized below.

Embodiments of the present disclosure are directed toward a system that includes at least one computer processor configured with software. The software can be stored on tangible computer readable medium. When the software is executed by the computer processor, the computer processor becomes specially configured. In one embodiment, the system is configured to receive transaction data from customer-oriented terminals. The transaction data can include requests for monetary transfers on behalf of customers. The customers can hold a checking or savings account(s) at a financial institution. The monetary transfers can be requests to take funds from the accounts. In response to receiving the transaction data, the system accesses customer account information, which can include the amount of funds in the checking or savings accounts. The system then determines whether sufficient funds exist in the accounts to cover the financial transactions. In response to a potential overdraft of one or more customer accounts, the system accesses stored customer information and determines eligibility of the customer for deferment of overdraft fees. The determination can be based upon the stored customer information. The system then authorizes the transaction based upon the determination of eligibility. In response to an overdraft occurring due to subsequent settlement, the system defers a fee for the overdraft. A grace period is then provided during which funds can be transferred to cover the overdraft without charging a penalty and without charging interest.

Embodiments of the present disclosure are directed toward a method that includes executing software on at least one computer processor. When the software is executed by the computer processor, the computer processor becomes specially configured. In one embodiment, the system is configured to receive transaction data from customer-oriented terminals. The transaction data can include requests for monetary transfers on behalf of customers. The customers can hold a checking or savings account(s) at a financial institution. The monetary transfers can be requests to take funds from the accounts. In response to receiving the transaction data, the system accesses customer account information, which can include the amount of funds in the checking or savings accounts. The system then determines whether sufficient funds exist in the accounts to cover the financial transactions. In response to a potential overdraft of one or more customer accounts, the system accesses stored customer information and determines eligibility of the customer for deferment of overdraft fees. The determination can be based upon the stored customer information. The system then authorizes the transaction based upon the determination of eligibility. In response to an overdraft occurring due to subsequent settlement, the system defers a fee for the overdraft. A grace period is then provided during which funds can be transferred to cover the overdraft without charging a penalty and without charging interest.

Embodiments of the present disclosure are directed toward a method that includes executing software on at least one computer processor. When the software is executed by the computer processor, the computer processor becomes specially configured. In one embodiment, the system is configured to receive transaction data from customer-oriented terminals. The transaction data can include requests for monetary transfers on behalf of customers. The customers can hold a checking or savings account(s) at a financial institution. The monetary transfers can be requests to take funds from the accounts. In response to receiving the transaction data, the system accesses customer account information, which can include the amount of funds in the checking or savings accounts. The system then determines whether sufficient funds exist in the accounts to cover the financial transactions. In response to a potential overdraft of one or more customer accounts, the system accesses stored customer information and determines whether the checking or savings account is linked to a sponsor account and whether the authorized customer is responsible for overdraft fees. These determinations can be based upon the stored customer information. The system then authorizes the transaction based upon the determinations. In response to an overdraft occurring due to subsequent settlement, the system charges a fee for the overdraft to the customer authorized to initiate monetary transfers. In certain embodiments, a grace period is then provided during which funds can be transferred to cover the overdraft without charging a penalty and without charging interest.

The above summary is not intended to describe each illustrated embodiment or every implementation of the present disclosure.

BRIEF DESCRIPTION OF FIGURES

The disclosure may be more completely understood in consideration of the detailed description of various embodiments of the disclosure that follows in connection with the accompanying drawings as follows.

Figure 1:
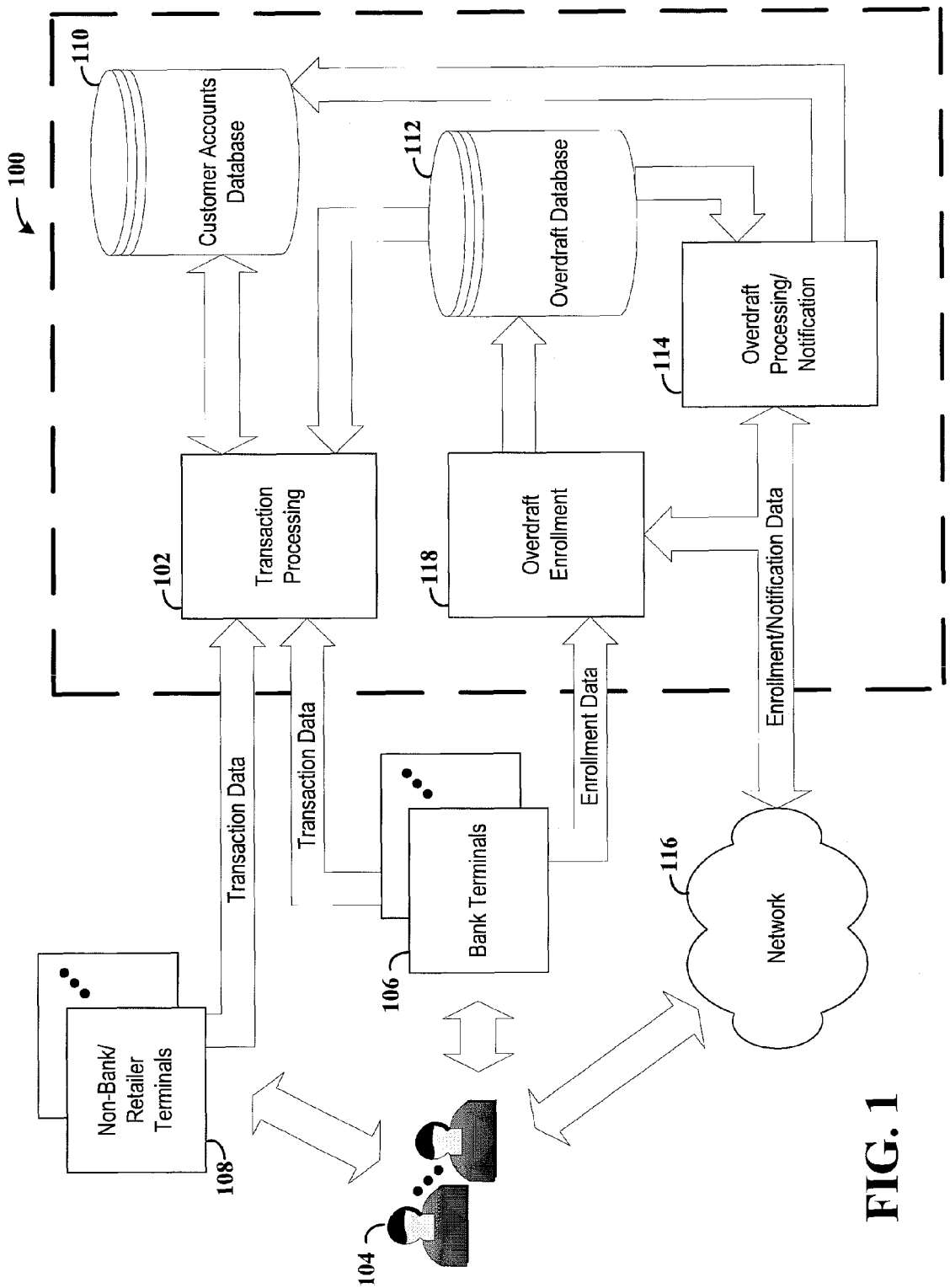
FIG. 1 shows a block diagram of a circuit-based network system, consistent with an embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The present disclosure is believed to be useful for certain computer-implemented circuits which automatically provide customers of a financial institution with an overdraft protection program. Implementations of the present disclosure have been found to be particularly advantageous for operation by banks for providing customers the opportunity to have overdraft protection for accounts while avoiding overdraft fees. While the present disclosure is not necessarily limited to such applications, various aspects of the disclosure may be appreciated through a discussion of various examples using this context.

As a first example, an embodiment of the present disclosure is directed to a computer-based circuit operable on behalf of a financial institution for overdraft protection on behalf of customers of the financial institution. The computer-based circuit includes a network-interface circuit, a computer arrangement, and a memory circuit for managing and accessing a database relevant to the customer account types and overdraft protection information. The network-interface circuit, such as a broadband communication pathway or local area link, is configured to receive transaction data, from a customer-oriented terminal, indicative of one of the plurality of customers having actively engaged-in a financial transaction involving an account that the customer holds at the financial institution. Example types of transactions include (without limitation) ATM withdrawals, online bill pay, ACH transactions, and using a debit card.

The computer arrangement, which would be operated on behalf of the bank or other financial institution, includes a software-programmed computer system, configured for each of the plurality of customers, to perform the following operations: the computer arrangement first accesses the customer's account information in the customer accounts database and determines whether the customer's account contains sufficient funds to cover the amount of the actively engaged transaction. The computer arrangement approves the transaction if the account contains sufficient funds to cover the transaction. The computer arrangement also approves the transaction if the account does not contain sufficient funds and the customer is enrolled in the overdraft protection program. After approval of the transaction, there is a potential overdraft of the account that would occur if settlement is subsequently effected by the financial institution. Instead of charging the customer a fee for overdrafting their account after approving the transaction and settlement occurs, the customer is given a grace period (e.g., 48 hours) during which to provide funds to cover the amount of the overdraft and thereby avoid being charged the fee for overdrafting their account. At the end of the grace period, the customer is charged the fee for the overdraft if they do not provide sufficient funds to cover the amount of the overdraft.

In various implementations, the grace period represents a time during which the financial institution provides funds to cover the transaction(s). In this manner, the financial institution is effectively extending a short-term loan for which the customer can choose to pay before the grace period expires without incurring a penalty. The financial institution can therefore consult a set of rules that determine whether or not the loan can be extended. The rules can assess, for instance, risk factors involved with the particular transaction. These risk factors can include, without limitation, the potential for fraud, the likelihood of default by the customer, limitations on the value of the overdraft and the cost to the financial institution for the short-term loan.

According to one embodiment of the present disclosure, a circuit-based network system, including for example, ATMs and general purpose computer arrangements, provides the functionality described herein. This circuit-based system receives and responds to data from an internal or external site (relative to the financial institution), oftentimes spurred by a customer transaction activity. The flexibility of the algorithms and implementations as implemented in computer-accessible databanks on behalf of the customer's financial institution, allows for a wide range of different options to be offered to the customer and implemented on the customer's behalf.

FIG. 1 is a block diagram of a circuit-based network system operable on behalf of a bank for overdraft protection and forgiveness on behalf of customers of the bank who are enrolled in an overdraft program, consistent with an embodiment of the present disclosure. The system 100 includes a network-interface/transaction processing circuit 102 that is configured to receive transaction data, from customer-oriented terminals, indicative of the customers 104 of the bank having actively engaged-in various types of financial transactions. The types of customer-oriented terminals vary depending on the implementation. For example, customer-oriented terminals can include bank terminals 106 and/or non-bank/retailer terminals 108. Examples of bank terminals 106 are ATMs of the bank, teller counters located at various branches of the bank, ATMs of other banks, and any other type of interface at which the customers 104 engage in transactions with a bank. Examples of non-bank/retailer terminals 108 are point of sale terminals at which the customers make purchases using checks, debit cards, credit cards, etc. that are tied to accounts held by the customers 104 at the bank. The customer-oriented terminals connect to the system 100 through networks, which, for the non-bank/retailer terminals 108, could be part of a payment network or an interface specifically designed to connect directly to system 100, and which, for the bank terminals 106, could be part of an ATM network.

In one implementation, the transaction processing circuit 102 accesses the customer's account information in customer accounts database 110 and authenticates/approves the financial transaction if the customer's account contains sufficient funds to cover the engaged-in transaction. The transaction processing circuit sends a debit instruction to customer accounts database 110 to instruct the customer's account to be debited by the amount of the approved transaction. The customer accounts database 110 contains information regarding the accounts held by the customers 104 at the bank (e.g., checking and savings accounts).

In the event that the customer's account does not contain sufficient funds to cover the engaged-in transaction, the transaction processing circuit 102 accesses overdraft database 112 to determine whether the customer is enrolled in the overdraft program. In a specific embodiment, the transaction processing circuit 102 extracts a customer ID that identifies the customer who is engaged-in the financial transaction from the received transaction data and provides the extracted customer ID to the overdraft database 112, which contains customer profile data concerning the customers of the bank who are enrolled in the overdraft program. The transaction processing circuit 102 approves the engaged-in transaction if the customer is enrolled in the overdraft program, otherwise the transaction is disapproved. In one implementation, when an actively engaged-in transaction is disapproved, the customer is provided with the option of enrolling in the overdraft program. For example, the customer can be provided with a prompt at an ATM asking whether the customer wants to enroll in the overdraft program. The transaction processing circuit 102 approves the engaged-in transaction if the customer chooses to enroll in the overdraft program.

The transaction processing circuit 102 provides a fee instruction to the overdraft database 112 when approval of the engaged-in transaction results in an overdraft of the customer's account. The fee for the overdraft is not immediately applied to the customer's account; instead the customer is given a grace period (e.g., 48 hours) during which the customer can transfer funds to their account to cover the overdraft and thereby avoid being charged the fee for overdrafting their account. The system 100 includes an overdraft processing and notification circuit 114 that monitors the status of customer overdrafts. For example, in response to a customer overdrafting their account, the overdraft processing and notification circuit 114 starts the grace period and sends a debit instruction to the customer accounts database 110 at the expiration of the grace period if the customer has not deposited sufficient funds in the account to cover the overdraft.

In one implementation, the system 100 provides notification to a customer when a transaction results in an overdraft of their account. For example, overdraft processing and notification circuit 114 can send notification to the customer over a network 116. The network 116 can be any of a variety of public/private types including, e.g., mobile-telephone networks, the Internet or an arrangement of such communication interfaces that permit for conventional, custom and/or customer-specific online banking. In a specification implementation, notification is provided to the customer via text message, email and/or an alert posted by the bank on the customer's online account access.

The customers of the bank can enroll in the overdraft protection program in any one of a number of manners. For example, the customers can enroll using bank terminal 106 and the customers can enroll online via network 116. Enrollment data for the customers is provided to overdraft enrollment circuit 118, which provides instructions to overdraft database 112. In one implementation, the overdraft enrollment circuit 118 generates a customer ID for each of the customers who enroll in the overdraft program. The customer ID could be, for example, the account number of the customer enrolled in the overdraft program.

In another implementation, the customers are provided with various options upon enrolling in the overdraft program. For example, the customer can choose how they want to receive notification of overdrafts (e.g., by email, text message, recorded telephone call or a notification on website). In a specific implementation, the customer can also select options regarding which overdrafts the bank should approve. For example, the customer can specify that only certain types of transactions that result in an overdraft should be approved (e.g., checks that result in an overdraft are approved, but debit card purchases that would result in an overdraft are denied). The customer could also specify that only overdrafts under a certain dollar amount (e.g., $20) are to be approved. In a further implementation, the customer can link another account (e.g., a savings account) to the account that is enrolled in the overdraft program. The customer can instruct the bank to automatically debit funds from the linked account at the expiration of the grace period if the customer does not provide sufficient funds to cover the overdraft. The overdraft database 112 contains customer profile data concerning the various options that are selected by customers of the bank enrolled in the overdraft program.

Embodiments of the present disclosure are also directed toward a computer readable medium programmed with instructions that when executed by a processor perform the various steps or algorithms disclosed herein. These algorithms include those disclosed in the figures and related discussion as well as variations thereof.

For instance, embodiments are directed toward a system that includes at least one computer processor configured with software. The software can be stored on tangible computer readable medium. When the software is executed by the computer processor, the computer processor becomes specially configured. In one embodiment, the system is configured to receive transaction data from customer-oriented terminals, such as terminals 106 or 108. The transaction data can include requests for monetary transfers on behalf of customers 104. The customers 104 can hold a checking or savings account(s) at a financial institution. The monetary transfers can be requests to take funds from the accounts. In response to receiving the transaction data, the system accesses customer account information 110, which can include the amount of funds in the checking or savings account(s). The system then determines whether sufficient funds exist in the accounts to cover the financial transactions. In response to a potential overdraft of one or more customer accounts, the system accesses stored customer information and determines eligibility of the customer for deferment of overdraft fees. The determination can be based upon the stored customer information. The system then authorizes the transaction based upon the determination of eligibility. In response to an overdraft occurring due to subsequent settlement, the system defers a fee for the overdraft. A grace period is then provided during which funds can be transferred to cover the overdraft without charging a penalty and without charging interest.

Figure 2:
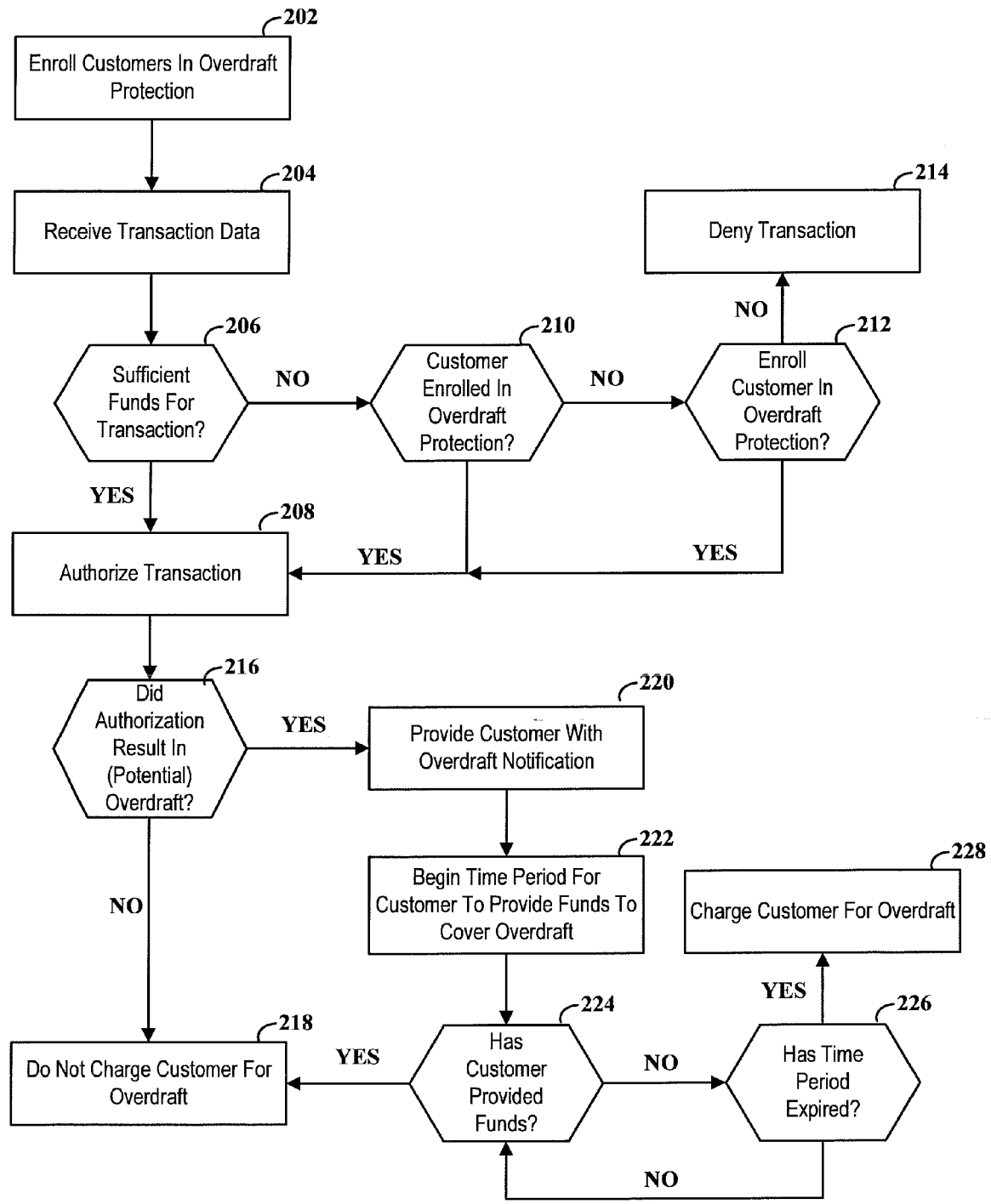
FIG. 2 shows a flow diagram of operation of an overdraft program, consistent with another embodiment of the present disclosure.

FIG. 2 is a flow diagram of operation of an overdraft program for customers of a bank, consistent with another embodiment of the present disclosure. Customers are enrolled in the bank's overdraft protection program in step 202. Enrollment can be accomplished in any number of manners and can include the customers providing various information, as consistent with the various embodiments discussed herein. Enrollment can include enrolling the customer in the overdraft program, whereby each account held by the customer at the bank is subject to overdraft protection. Enrollment can also include enrolling specific customer accounts in the overdraft program (e.g., only the customer's checking account is subject to overdraft protection).

Transaction data representing a customer of the bank being actively engaged-in a financial transaction is received at step 204. A determination is made at step 206 whether the customer's account contains sufficient funds to cover the transaction. The transaction is authorized/approved if the customer's account contains sufficient funds to cover the transaction at step 208. A determination is made at step 210 whether the customer is enrolled in the overdraft program if the customer's account does not contain sufficient funds to cover the transaction. The transaction is authorized at step 208 if the customer is enrolled in the overdraft program. In one implementation, the approval of a transaction that results in (or is likely to result in) an overdraft is contingent on various options selected by the customer enrolled in the overdraft program, as discussed herein. The customer is provided with the option of enrolling in the overdraft program at step 212 if the customer's account does not contain sufficient funds to cover the transaction and the customer is not enrolled in the overdraft program. The transaction is authorized at step 208 if the customer enrolls in the overdraft program. The transaction is denied at step 214 if the customer's account does not contain sufficient funds to cover the transaction, the customer is not enrolled in the overdraft program and the customer chooses not to enroll in the overdraft program.

As an example implementation, a customer may make a purchase using a debit card linked to an account held at their bank. This purchase may exceed the value of funds currently in the account. The bank system can determine that the customer is eligible for deferment of overdraft fees and for enrollment in the overdraft program. The bank system can then send a communication (e.g., text, email, website, telephone call or direct mailing) to the customer. This communication can include both an indication of the overdraft and option to enroll in the overdraft program. The customer can then see, firsthand, the fees that can be saved through enrollment. This provides a real world and personalized example of the benefits provided by the offered overdraft program to the customer.

A determination is made whether authorization of the transaction resulted in an overdraft of the customer's account at step 216. The customer is not charged a fee at step 218 if authorization of the transaction did not result in an overdraft of the customer's account. Notification is provided to the customer at step 220 if authorization of the transaction resulted (or will soon result in) in an overdraft of the customer's account. Notification can be provided in any of a variety of manners including, for example, by telephone, text message and/or email, as discussed herein. A time period is stated at step 222 during which the customer has the opportunity to deposit funds in their account to cover the amount of the overdraft that resulted from authorization of the transaction. For example, the customer is given a grace period during which the customer can avoid being charged a fee for the overdraft by providing funds to cover the overdraft. A determination is made at step 224 whether the customer has provided funds to cover the overdraft and a determination is made at step 226 whether the time period has expired. The customer is not charged a fee for the overdraft at step 218 if the customer provides funds to cover the overdraft before expiration of the time period. The customer is charged a fee for the overdraft at step 228 if the customer does not provide funds to cover the overdraft before expiration of the time period. In one implementation, the fee for the overdraft is debited from one of the customer's accounts.

The circuit-implemented system can include one or more of: discrete logic circuitry, programmable logic arrays, specialized processors or general purpose processors specifically programmed. Combinations of these and other circuit elements are also possible and within the scope of various embodiments of the present disclosure. For example, systems consistent with the aspects shown in FIG. 1 could be implemented in a variety of circuit-based forms, such as through the use of data processing circuit modules. More specifically, such systems are exemplified by implementation in high-speed programmable computer/processor circuits that execute stored instructions to provide operations corresponding to the various blocks of FIG. 1. Alternatively, such a computer/processor could be implemented in combination with discrete and or semi-programmable circuitry (e.g., as Field-Programmable Gate Arrays, Programmable Logic Devices/Arrays). Also various ones of the illustrated blocks, and those functions discussed in text, can be implemented using integrated and nonintegrated approaches, e.g., with certain ones of the blocks located remotely and/or operated disparately relative to the other blocks.

Other embodiments are directed to providing the advantageous situation in which overdraft protection is provided for parent/employer (sponsor) of the card holder, but with a payment penalty from the account of the child/employee card holder to the bank for such an overdraft. The business rules would link two accounts for such overdrafts: the sponsor's savings account as the main account for covering, and the child/employee's account for effecting payment to the bank for the penalty fee. In this way, the bank makes money, the parent/employer is provided overdraft protection, and the child/employee is held accountable automatically with a reporting system from the bank to the parent/employer for overdraft and other "threshold-related" violations.

Consistent with one or more embodiments of the present disclosure, a system provides oversight and control functions for individuals that allow other individuals access to their accounts. For instance, a company can allow employees to have access to one or more company accounts or a parent may allow a child to access one or more of their accounts. The system provides an option for each individual to enroll into the overdraft protection program. The individual can have separate accounts and determine for themselves whether or not to participate in the overdraft protection program. In certain implementations, the individuals assume personal responsibility for any resulting overdraft fees. This can be particularly useful for alleviating the need for extensive auditing of spending by the individuals. For instance, companies can provide monthly allotments of money to accounts linked to their employees. If an employee that is enrolled in the overdraft protection program incurs an overdraft fee, the employee has agreed to assume responsibility for the fee. Thus, the employee expenditure can be limited according to the company's allotment and without risking fees being assessed against the company.

Consistent with certain embodiments, the fees are tracked and assessed against the responsible individual. This can include, for instance, assessing the fee against an account, such as a savings account, checking account or credit card account that is held by the individual. Alternatively, the fee can be billed to the responsible individual as part of a periodic (monthly) statement.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. Such modifications and changes do not depart from the true spirit and scope of the present disclosure, including that set forth in the following claims.

What is claimed is:

1. A system comprising:
   at least one computer processor configured with software that when executed by the computer processor is configured to:
   electronically receive transaction data from customer-oriented terminals, the transaction data including requests for monetary transfers on behalf of customers having, and the monetary transfers from, one or more checking or savings accounts held at a financial institution;
   provide, in response to the checking or savings account being enrolled in an overdraft program, one or more options to the customer for linking two accounts, one of the linked accounts being one of the checking or savings accounts;
   access, in response to receiving the transaction data, customer account information that includes the amount of funds in the checking or savings accounts;
   determine whether sufficient funds exist in the accounts to cover the financial transactions; and
   in response to indication of a potential overdraft of one or more customer checking or savings accounts,
      access stored customer information;
      determine, based upon the stored customer information, eligibility of the customer for deferment of overdraft fees; and
      authorize the transaction based upon the determination;
   in response to indication of overdraft occurring,
      indicate whether to defer a fee for the overdraft;
      indicate whether to provide a grace period during which funds can be transferred to cover the overdraft without charging a penalty and without charging interest; and
      automatically transfer funds from the other linked account in response to the expiration of the grace period and to the customer failing to provide sufficient funds to cover the overdraft.

2. The system of claim 1, wherein the at least one computer processor is further configured with software that when executed by the computer processor presents the customer with an option of enrolling in an overdraft program in response to determining that a potential overdraft has occurred and that the customer is not enrolled in the overdraft program.

3. The system of claim 1, wherein the at least one computer processor is further configured with software that when executed by the computer processor responds to a potential overdraft by communicating with a notification circuit configured to start the grace period and by sending a debit instruction to a customer accounts database at the expiration of the grace period if the customer has not deposited sufficient funds in the account to cover the overdraft.

4. The system of claim 1, wherein the at least one computer processor is further configured with software that when executed by the computer processor provides options to customers regarding which overdrafts to approve.

5. The system of claim 1, wherein the at least one computer processor is further configured with software that when executed by the computer processor provides options to a customer for specifying approval of the overdraft according to certain types of transactions, wherein the types of transactions include one or more of checks and debit card purchases.

6. The system of claim 1, wherein the at least one computer processor is further configured with software that when executed by the computer processor provides options to a customer regarding a transaction amount above which overdrafts should not be approved.

7. The system of claim 1, wherein the at least one computer processor is further configured with software that when executed by the computer processor charges fees incurred due to insufficient funds in the checking or savings accounts to the other linked account and wherein the linked accounts are owned by two different entities.

8. The system of claim 1, further including an overdraft database that contains customer profile data concerning the customer-selected options for authorizing potential overdrafts.

9. A system comprising:
   at least one computer processor configured with software that when executed by the computer processor is configured to:
   electronically receive customer initiated transaction data, the transaction data including requests for monetary transfers on behalf of a customer authorized to initiate monetary transfers from a checking or savings account held at a financial institution;
   provide, in response to the checking or savings account being enrolled in an overdraft program, one or more options to the customer for linking two accounts, one of the linked accounts being the checking or savings account;
   access, in response to receiving the transaction data, customer account information that includes the amount of funds in the checking or savings accounts;
   determine whether sufficient funds exist in the accounts to cover the financial transactions; and
   in response to indication of a potential overdraft of one or more customer accounts,
      access stored customer information;
      determine, based upon the stored customer information, eligibility of the customer for deferment of overdraft fees and whether the checking or savings account is linked to a sponsor account for providing payment of overdraft fees; and
      authorize the transaction based upon the determination;
   in response to indication of the overdraft occurring, indicate whether to defer or charge a fee for the overdraft and indicate whether to provide a grace period during which funds can be transferred to cover the overdraft without charging a penalty and without charging interest to the customer authorized to initiate monetary transfers; and
   automatically transfer funds from the other linked account in response to the expiration of the grace period and to the customer failing to provide sufficient funds to cover the overdraft.

10. A computer readable tangible storage medium storing a set of computer instructions that when executed by one or more processors:
   receives transaction data from customer-oriented terminals, the transaction data including requests for monetary transfers on behalf of one or more customers having, and the monetary transfers from, a checking or savings account held at a financial institution;
   provide, in response to the checking or savings account being enrolled in an overdraft program, one or more options to the customer for linking two accounts, one of the linked accounts being the checking or savings account;

accesses, in response to receiving the transaction data, customer account information that includes the amount of funds in the checking or savings accounts;

determines whether sufficient funds exist in the accounts to cover the financial transactions;

in response to a potential overdraft of one or more customer accounts, accesses stored customer information;

determines, based upon the stored customer information, eligibility of the customer for deferment of overdraft fees; and authorizes the transaction based upon the determination of eligibility; and in response to overdraft occurring, defers a fee for the overdraft;

provides a grace period during which funds can be transferred to cover the overdraft without charging a penalty and without charging interest; and automatically transfer funds from the other linked account in response to the expiration of the grace period and to the customer failing to provide sufficient funds to cover the overdraft.

11. The tangible storage medium of claim 10, wherein the tangible storage medium further includes computer instructions that when executed by one or more processors presents the customer with an option of enrolling in the overdraft program in response to determining that a potential overdraft has occurred and that the customer is not enrolled in the overdraft program.

12. The tangible storage medium of claim 10, wherein the tangible storage medium further includes computer instructions that when executed by one or more processors responds to a potential overdraft by communicating with a notification circuit configured to start the grace period and by sending a debit instruction to a customer accounts database at the expiration of the grace period if the customer has not deposited sufficient funds in the account to cover the overdraft.

13. The tangible storage medium of claim 10, wherein the tangible storage medium further includes computer instructions that when executed by one or more processors provides options to customers regarding which overdrafts to approve.

14. The tangible storage medium of claim 10, wherein the tangible storage medium further includes computer instructions that when executed by one or more processors provides options to a customer for specifying approval of the overdraft according to certain types of transactions, wherein the types of transactions include one or more of checks and debit card purchases.

15. The tangible storage medium of claim 10, wherein the tangible storage medium further includes computer instructions that when executed by one or more processors provides options to a customer regarding a transaction amount above which overdrafts should not be approved.

16. The tangible storage medium of claim 10, wherein the tangible storage medium further includes computer instructions that when executed by one or more processors charges fees incurred due to insufficient funds in the checking or saving accounts to the other linked account and wherein the linked accounts are owned by two different entities.

17. The tangible storage medium of claim 10, further including an overdraft database that contains customer profile data concerning the customer-selected options for authorizing potential overdrafts.

18. A method, comprising:

executing software instructions using said at least one computer processor, the instructions configuring a computer system to:

electronically receive transaction data from customer-oriented terminals, the transaction data including requests for monetary transfers on behalf of customers having, and the monetary transfers from, a checking or savings account held at a financial institution;

provide, in response to the checking or savings account being enrolled in an overdraft program, one or more options to the customer for linking two accounts, one of the linked accounts being the checking or savings account;

access, in response to receiving the transaction data, customer account information that includes the amount of funds in the checking or savings accounts;

determine whether sufficient funds exist in the accounts to cover the financial transactions; and in response to indication of a potential overdraft of one or more customer accounts, access stored customer information;

determine, based upon the stored customer information, eligibility of the customer for deferment of overdraft fees; and authorize the transaction based upon the determination of eligibility; and in response to indication of the potential overdraft occurring, defer a fee for the overdraft;

provide a grace period during which funds can be transferred to cover the overdraft without charging a penalty and without charging interest; and automatically transfer funds from the other linked account in response to the expiration of the grace period and to the customer failing to provide sufficient funds to cover the overdraft.

19. The system of claim 9, wherein the at least one computer processor is further configured with software that when executed by the computer processor determines, based upon the stored customer information, whether the customer authorized to initiate monetary transfers is enrolled in an overdraft protection program and in response to determining that the customer is enrolled in an overdraft protection program, provides a grace period during which funds can be transferred to cover the overdraft without charging a penalty and without charging interest.

* * * * *